United States Patent [19]

Brandin

[11] Patent Number: 5,942,002
[45] Date of Patent: Aug. 24, 1999

[54] METHOD AND APPARATUS FOR GENERATING A TRANSFORM

[75] Inventor: Christopher Lockton Brandin, Colorado Springs, Colo.

[73] Assignee: Neo-Lore

[21] Appl. No.: 08/613,037

[22] Filed: Mar. 8, 1996

[51] Int. Cl.[6] .................................................. H03M 13/00
[52] U.S. Cl. ..................... 714/757; 714/758; 714/777; 714/807; 711/216
[58] Field of Search .................................. 371/37.1, 37.6, 371/37.7, 37.8, 53, 37.03, 37.07; 395/800.27, 138; 370/471, 392, 401; 341/94; 711/216

[56] References Cited

U.S. PATENT DOCUMENTS

| | | | |
|---|---|---|---|
| 4,527,239 | 7/1985 | Brandin | 395/421.06 |
| 4,945,475 | 7/1990 | Bruffey et al. | 395/601 |
| 5,237,678 | 8/1993 | Kuechler et al. | 395/605 |
| 5,341,483 | 8/1994 | Frank et al. | 395/416 |
| 5,361,266 | 11/1994 | Kodama et al. | 371/37.7 |
| 5,388,257 | 2/1995 | Bauer | 395/601 |
| 5,390,196 | 2/1995 | Cecil et al. | 371/37.07 |
| 5,418,947 | 5/1995 | Hsu et al. | 395/601 |
| 5,517,512 | 5/1996 | Saegusa | 371/37.8 |
| 5,619,516 | 4/1997 | Li et al. | 371/53 |

*Primary Examiner*—Emmanuel L. Moise
*Attorney, Agent, or Firm*—Dale B. Halling

[57] ABSTRACT

A transform generator (20) has an input/output port (22). Coupled to the input/output port (22) is a controller (24). The input/output port (22) receives input transforms and data strings and outputs new transforms. A look up memory (26) is coupled to the controller (24) and is used to determine the new transforms. A shift module (28) and a combiner (30) are also coupled to the controller (24) and are used in combination with the memory (26) to determine a new transform.

22 Claims, 12 Drawing Sheets

Transform Lookup Table:
```
00- 00000000 77073096 EE0E612C 990951BA 076DC419 706AF48F E963A535 9E6495A3
08- 0EDB8832 79DCB8A4 E0D5E91E 97D2D988 09B64C2B 7EB17CBD E7B82D07 90BF1D91
10- 1DB71064 6AB020F2 F3B97148 84BE41DE 1ADAD47D 6DDDE4EB F4D4B551 83D385C7
18- 136C9856 646BA8C0 FD62F97A 8A65C9EC 14015C4F 63066CD9 FA0F3D63 8D080DF5
20- 3B6E20C8 4C69105E D56041E4 A2677172 3C03E4D1 4B04D447 D20D85FD A50AB56B
28- 35B5A8FA 42B2986C DBBBC9D6 ACBCF940 32D86CE3 45DF5C75 DCD60DCF ABD13D59
30- 26D930AC 51DE003A C8D75180 BFD06116 21B4F4B5 56B3C423 CFBA9599 B8BDA50F
38- 2802B89E 5F058808 C60CD9B2 B10BE924 2F6F7C87 58684C11 C1611DAB B6662D3D
40- 76DC4190 01DB7106 98D220BC EFD5102A 71B18589 06B6B51F 9FBFE4A5 E8B8D433
48- 7807C9A2 0F00F934 9609A88E E10E9818 7F6A0DBB 086D3D2D 91646C97 E6635C01
50- 6B6B51F4 1C6C6162 856530D8 F262004E 6C0695ED 1B01A57B 8208F4C1 F50FC457
58- 65B0D9C6 12B7E950 8BBEB8EA FCB9887C 62DD1DDF 15DA2D49 8CD37CF3 FBD44C65
60- 4DB26158 3AB551CE A3BC0074 D4BB30E2 4ADFA541 3DD895D7 A4D1C46D D3D6F4FB
68- 4369E96A 346ED9FC AD678846 DA60B8D0 44042D73 33031DE5 AA0A4C5F DD0D7CC9
70- 5005713C 270241AA BE0B1010 C90C2086 5768B525 206F85B3 B966D409 CE61E49F
78- 5EDEF90E 29D9C998 B0D09822 C7D7A8B4 59B33D17 2EB40D81 B7BD5C3B C0BA6CAD
80- EDB88320 9ABFB3B6 03B6E20C 74B1D29A EAD54739 9DD277AF 04DB2615 73DC1683
88- E3630B12 94643B84 0D6D6A3E 7A6A5AA8 E40ECF0B 9309FF9D 0A00AE27 7D079EB1
90- F00F9344 8708A3D2 1E01F268 6906C2FE F762575D 806567CB 196C3671 6E6B06E7
98- FED41B76 89D32BE0 10DA7A5A 67DD4ACC F9B9DF6F 8EBEEFF9 17B7BE43 60B08ED5
A0- D6D6A3E8 A1D1937E 38D8C2C4 4FDFF252 D1BB67F1 A6BC5767 3FB506DD 48B2364B
A8- D80D2BDA AF0A1B4C 36034AF6 41047A60 DF60EFC3 A867DF55 316E8EEF 4669BE79
B0- CB61B38C BC66831A 256FD2A0 5268E236 CC0C7795 BB0B4703 220216B9 5505262F
B8- C5BA3BBE B2BD0B28 2BB45A92 5CB36A04 C2D7FFA7 B5D0CF31 2CD99E8B 5BDEAE1D
C0- 9B64C2B0 EC63F226 756AA39C 026D930A 9C0906A9 EB0E363F 72076785 05005713
C8- 95BF4A82 E2B87A14 7BB12BAE 0CB61B38 92D28E9B E5D5BE0D 7CDCEFB7 0BDBDF21
D0- 86D3D2D4 F1D4E242 68DDB3F8 1FDA836E 81BE16CD F6B9265B 6FB077E1 18B74777
D8- 88085AE6 FF0F6A70 66063BCA 11010B5C 8F659EFF F862AE69 616BFFD3 166CCF45
E0- A00AE278 D70DD2EE 4E048354 3903B3C2 A7672661 D06016F7 4969474D 3E6E77DB
E8- AED16A4A D9D65ADC 40DF0B66 37D83BF0 A9BCAE53 DEBB9EC5 47B2CF7F 30B5FFE9
F0- BDBDF21C CABAC28A 53B39330 24B4A3A6 BAD03605 CDD70693 54DE5729 23D967BF
F8- B3667A2E C4614AB8 5D681B02 2A6F2B94 B40BBE37 C30C8EA1 5A05DF1B 2D02EF8D
```

FIG. 13

Transform Translation Table:
```
00- 00 41 C3 82 86 C7 45 04 4D 0C 8E CF CB 8A 08 49
10- 9A DB 59 18 1C 5D DF 9E D7 96 14 55 51 10 92 D3
20- 75 34 B6 F7 F3 B2 30 71 38 79 FB BA BE FF 7D 3C
30- EF AE 2C 6D 69 28 AA EB A2 E3 61 20 24 65 E7 A6
40- EA AB 29 68 6C 2D AF EE A7 E6 64 25 21 60 E2 A3
50- 70 31 B3 F2 F6 B7 35 74 3D 7C FE BF BB FA 78 39
60- 9F DE 5C 1D 19 58 DA 9B D2 93 11 50 54 15 97 D6
70- 05 44 C6 87 83 C2 40 01 48 09 8B CA CE 8F 0D 4C
80- 95 D4 56 17 13 52 D0 91 D8 99 1B 5A 5E 1F 9D DC
90- 0F 4E CC 8D 89 C8 4A 08 42 03 81 C0 C4 85 07 46
A0- E0 A1 23 62 66 27 A5 E4 AD EC 6E 2F 2B 6A E8 A9
B0- 7A 3B B9 F8 FC BD 3F 7E 37 76 F4 B5 B1 F0 72 33
C0- 7F 3E BC FD F9 B8 3A 7B 32 73 F1 B0 B4 F5 77 36
D0- E5 A4 26 67 63 22 A0 E1 A8 E9 6B 2A 2E 6F ED AC
E0- 0A 4B C9 88 8C CD 4F 0E 47 06 84 C5 C1 80 02 43
F0- 90 D1 53 12 16 57 D5 94 DD 9C 1E 5F 5B 1A 98 D9
```

METHOD AND APPARATUS FOR GENERATING A TRANSFORM

FIELD OF THE INVENTION

The present invention relates generally to the field of generating transforms, such as cyclical redundancy codes, polynomial codes and hashing codes, and more particularly to a method and apparatus for generating a transform.

BACKGROUND OF THE INVENTION

Figure 1:
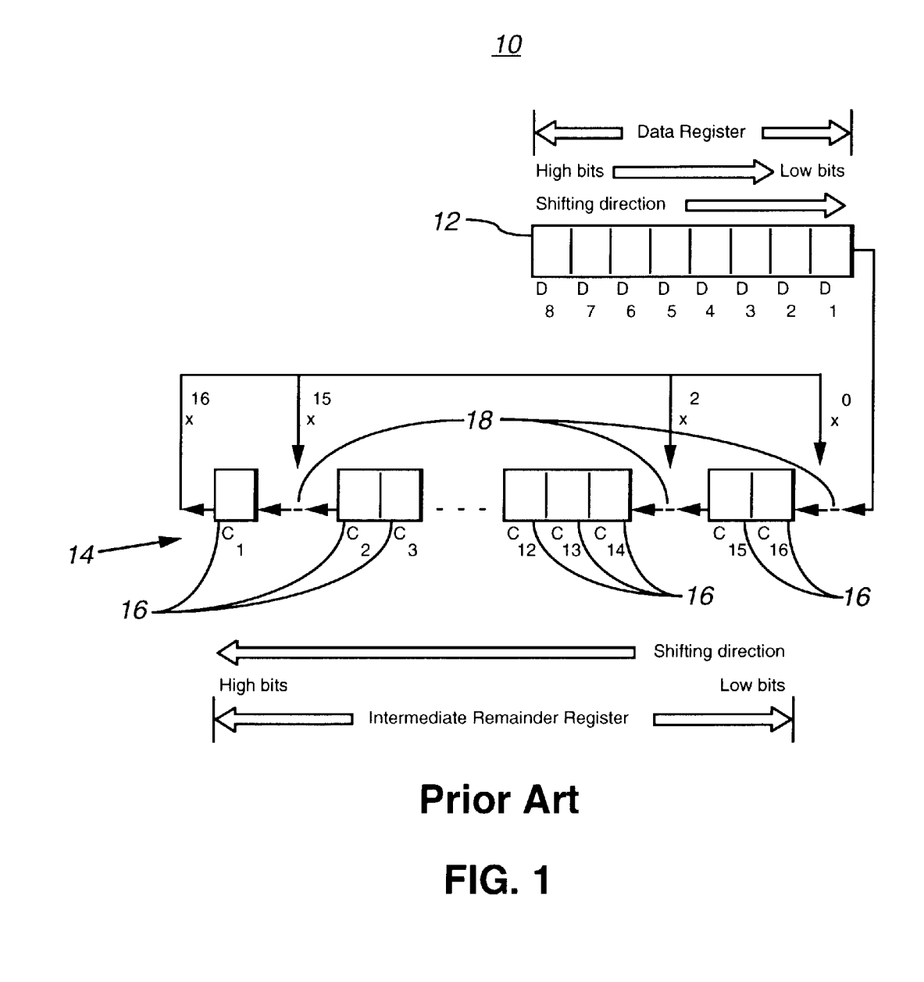
FIG. 1 is a schematic diagram of a prior art transform generator.

An example prior art transform generator 10 is shown in FIG. 1. The prior art transform generator 10 has a data register (shift register) 12 and an intermediate remainder register 14. The specific generator of FIG. 1 is designed to calculate a cyclical redundancy code (CRC-16). The plurality of registers 16 in the intermediate remainder register 14 are strategically coupled by a plurality of exclusive OR's 18. The data bits are shifted out of the data register 12 and into the intermediate register 14. When the data bits have been completely shifted into the intermediate register 14, the intermediate register contains the CRC associated with the data bits. Transform generators have also been encoded in software. Emulating the hardware proved to be an inefficient method of generating transforms in software, so software schemes generally use look up tables to calculate the transform one byte or nibble (4-bits) at a time. The table could be set up for any size of data quanta's (e.g., 1 bit, 10 bits, etc.).

Packetizers use transform generators to calculate CRCs for newly formed data packets. A packetizer receives packets (data) from a variety of sources. These received packets are then grouped according to their ultimate destination. If two small packets have the same destination they are combined into one packet and then transmitted to the destination. In prior art applications the packetizer removes the CRCs from both packets and then recalculates the CRC based on the combined data of both packets. In other scenarios the packetizer might receive one large packet that needs to be broken into two smaller packets. In prior art applications the large packet's CRC would be thrown away and a new CRC calculated from scratch for both of the smaller packets. This process is inefficient since the CRCs from the received packets contain useful information in calculating the CRCs for the outgoing packets.

A transform generator is also used in associative memories. The transform generator calculates the hashing code or polynomial code (see U.S. Pat. No. 4,527,239 Brandin) to determine the address of a data packet. When a data packet is a combination of two earlier packets prior art associative memories calculate a new transform (address) for the new data packet from scratch. Processing advantages can be achieved by a transform generator that could use the old transforms to calculate a new transform.

Thus there exists a need for a transform generator that can generater a new transform from existing transforms without using the underlying data.

SUMMARY OF THE INVENTION

A method that overcomes these problems generates a transform by receiving a first transform associated with a first data string. A second transform associated with a second data string is also received. The second transform is appended to the first transform to form a first-second combined transform for a first-second data string.

An apparatus for performing this method includes an input/output port coupled to a controller. The controller is also coupled to a lookup memory, a shift module and a combiner.

BRIEF DESCRIPTION OF THE DRAWINGS

FIG. 13 is a look up table for a CRC-32 polynomial code; and

FIG. 14 is a reverse look up table for the CRC-32 polynomial code.

DETAILED DESCRIPTION OF THE DRAWINGS

Figure 2:
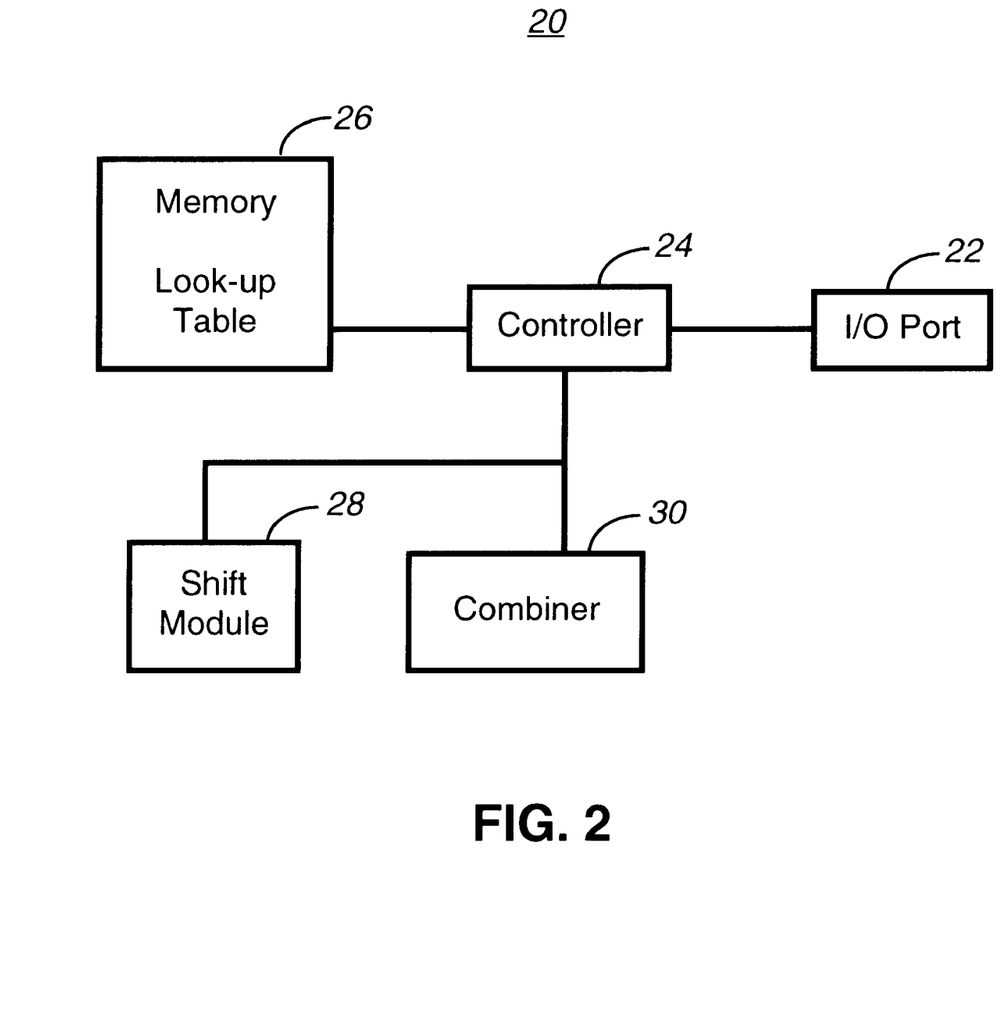
FIG. 2 is a block diagram of a transform generator according to the invention.

FIG. 2 shows a block diagram of a transform generator 20 according to the invention. Unlike prior art transform generators the transform generator 20 can calculate a new transform based on two previous transforms without reference to the underlying data. To understand how the transform generator 20 works it helps to understand some of the underlying mathematics. The underlying math is based on polynomial codes, including but not limited to cyclical redundancy codes. These codes can be expressed by the following equation:

$$X^{n-k}M(X)=Q(X)G(X)+R(X)$$

Where $X^{n-k}$ is a shifting term

M(X) is the message polynomial;

G(X) is the generator polynomial;

Q(X) is the quotient that results when the message is divided by the generator polynomial; and R(X) is the remainder of the division process.

The remainder is the CRC or transform of the message. It can be shown from the above equation that transform of two messages that have been exclusive OR'ed (combined) is equal to the exclusive OR'ed transforms associated with the two messages. If the first message is "A" and the second message is "B", the combined message is "AB". The message polynomial is:

$$AB(X)=X^ZA(X)+B(X)$$

Where Z is equal to the number of bits in the message B. and $$R_{AB}(X)=R(X^ZA(X))+R_B(X)$$

Thus to generate the transform for the message "AB" we need only combine the transform of "B" with the transform for "A0", where 0 is representative of Z nulls. When the transforms for "A" and "B" are known we just need to calculate the value of the shifted transform for "A" and combine it with the transform for "B". Fortunately, there is a simple process for calculating the shifted transform.

The transform generator 20 uses the math described above to calculate new transforms using existing transforms. An input/output port 22 is used to receive the existing transforms and output the new transforms. The I/O port 22 is coupled to a controller 24 that coordinates the functions of a memory 26, a shift module 28 and a combiner 30. The memory contains a look up table for the transform. An example of such a look up table is shown in FIG. 13. The table in FIG. 13 is based on a CRC-32 transform that calculates the transform on a byte by byte basis. Other tables can be generated for other polynomials. The invention is not limited to CRC polynomials, but can accommodate a wide variety of other polynomials. The specific polynomial depends on the application of the transform generator. The shift module 28 performs the function of determining the shifted transform. The combiner is used to combine (XOR) for instance a shifted first transform and a second transform to form first-second transform. The first-second transform is defined as the transform associated with a first-second data string (e.g., in a communications example the second data string is transmitted immediately after the first data string: first-second data string). The process of shifting the first transform and combining it with the second transform is called appending. The transform generator can be implemented in software, or in hardware consisting of a memory, a microprocessor and a few shift registers and exclusive or gates.

Figure 3:
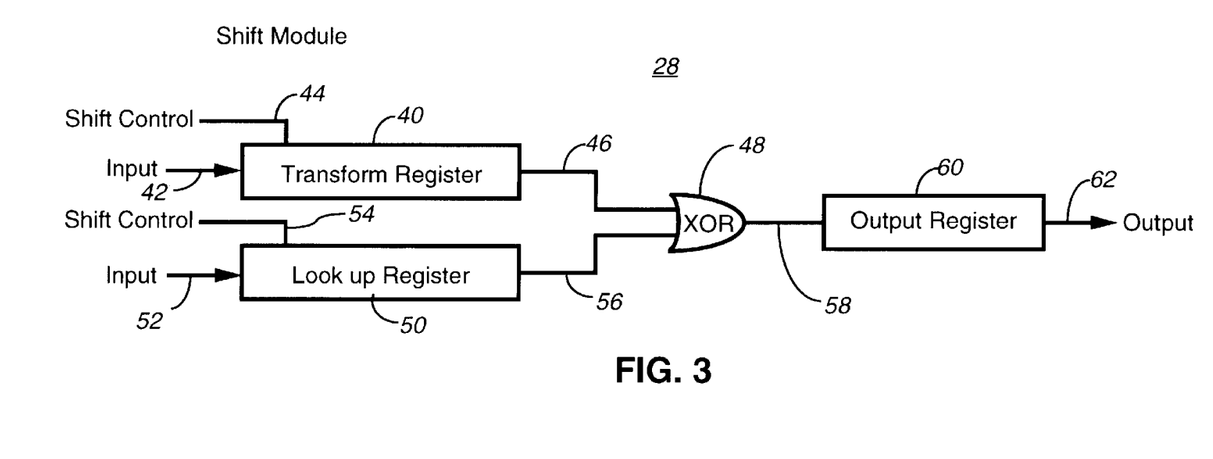
FIG. 3 is a schematic representation of a shift module used in the transform generator of FIG. 2.

FIG. 3 shows a schematic diagram of the shift module 28 used by the transform generator 20. The transform to be shifted is stored in a transform register 40 having an input 42, a shift control 44 and an output 46. The output 46 is connected to an exclusive OR gate 48. A look up register 50 contains a member selected using a pointer derived from the transform to be shifted. The look up register 50 has an input 52, a shift control 54 and an output 56. The output 56 is coupled to a second input of the exclusive OR gate 48. The output 58 of the exclusive OR gate is stored in an output register 60. After the appropriate processing the output register 60 contains the shifted transform, which is transmitted to the controller 24 via an output 62.

Figure 4:
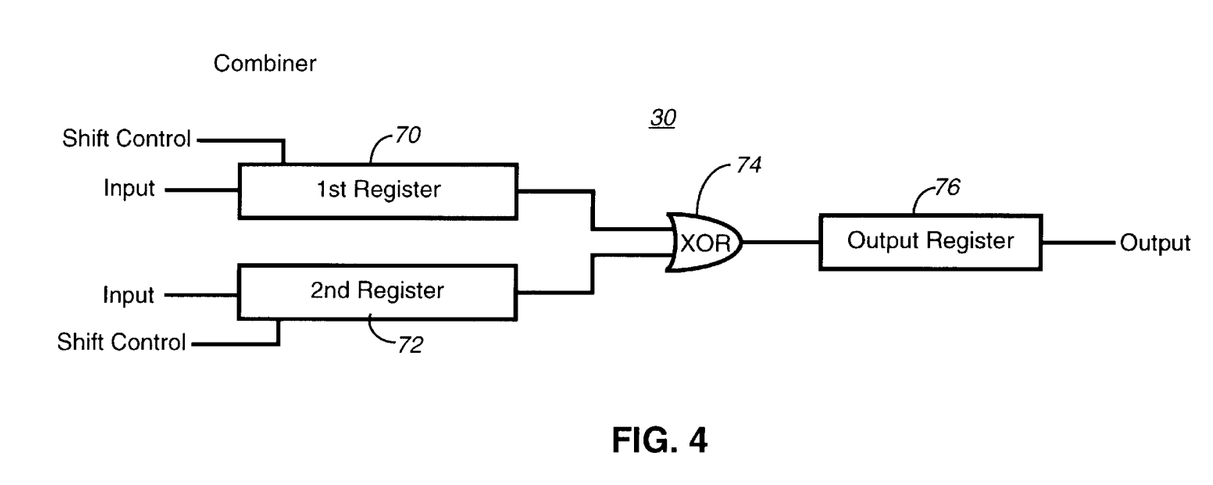
FIG. 4 is a is a schematic representation of a combiner used in the transform generator of FIG. 2.

FIG. 4 shows a schematic diagram of the combiner 30 used by the transform generator 20. A first register 70 and a second register 72 have there outputs coupled to an exclusive OR gate 74. In one example the first register 70 contains the shifted first transform and the second register 72 contains the second transform. The output of the exclusive OR gate 74 is connected to an output register 76. Once the shifted first transform is combined with the second transform the output register 76 contains the first-second transform.

Figure 5:
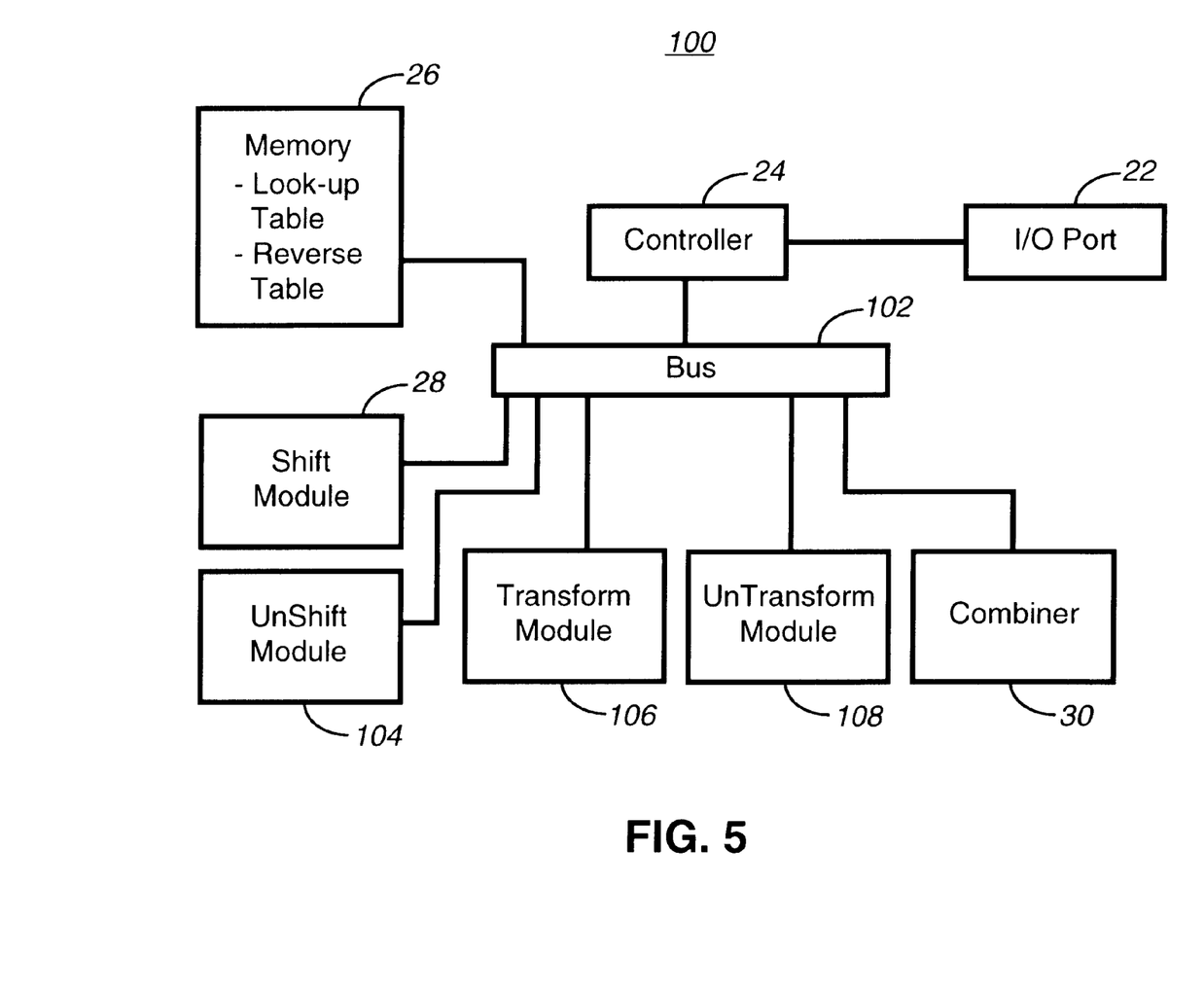
FIG. 5 is a block diagram of an alternative embodiment of the transform generator according to the invention.

FIG. 5 is a block diagram of an alternative embodiment of a transform generator 100 according to the invention. The transform generator 100 has an I/O port 22 coupled to the controller 24. The controller 24 communicates over a bus 102 to a memory 26, a shift module 28, an unshift module 104, a transform module 106, an untransform module 108 and a combiner 30. The memory 26 contains both the look up table (e.g., the table in FIG. 13) and a reverse look up table, an example of which is shown in FIG. 14. The reverse look up table in FIG. 14 is based on the same CRC-32, byte by byte approach. The transform generator 100 of FIG. 5 can combine transforms like the transform generator 20 of FIG. 2. In addition, the transform generator 100 can determine a first-second transform given the first transform and a second data string or given a first data string and a second transform. The transform generator 100 can remove the second transform from the first-second combined transform to determine the first transform. Essentially, the transform generator 100 allows the complete manipulation of transforms given sufficient inputs as either transforms or data. How this is accomplished will be explained in more detail after each of the modules are explained in more detail with respect to FIGS. 6–9.

Figure 6:
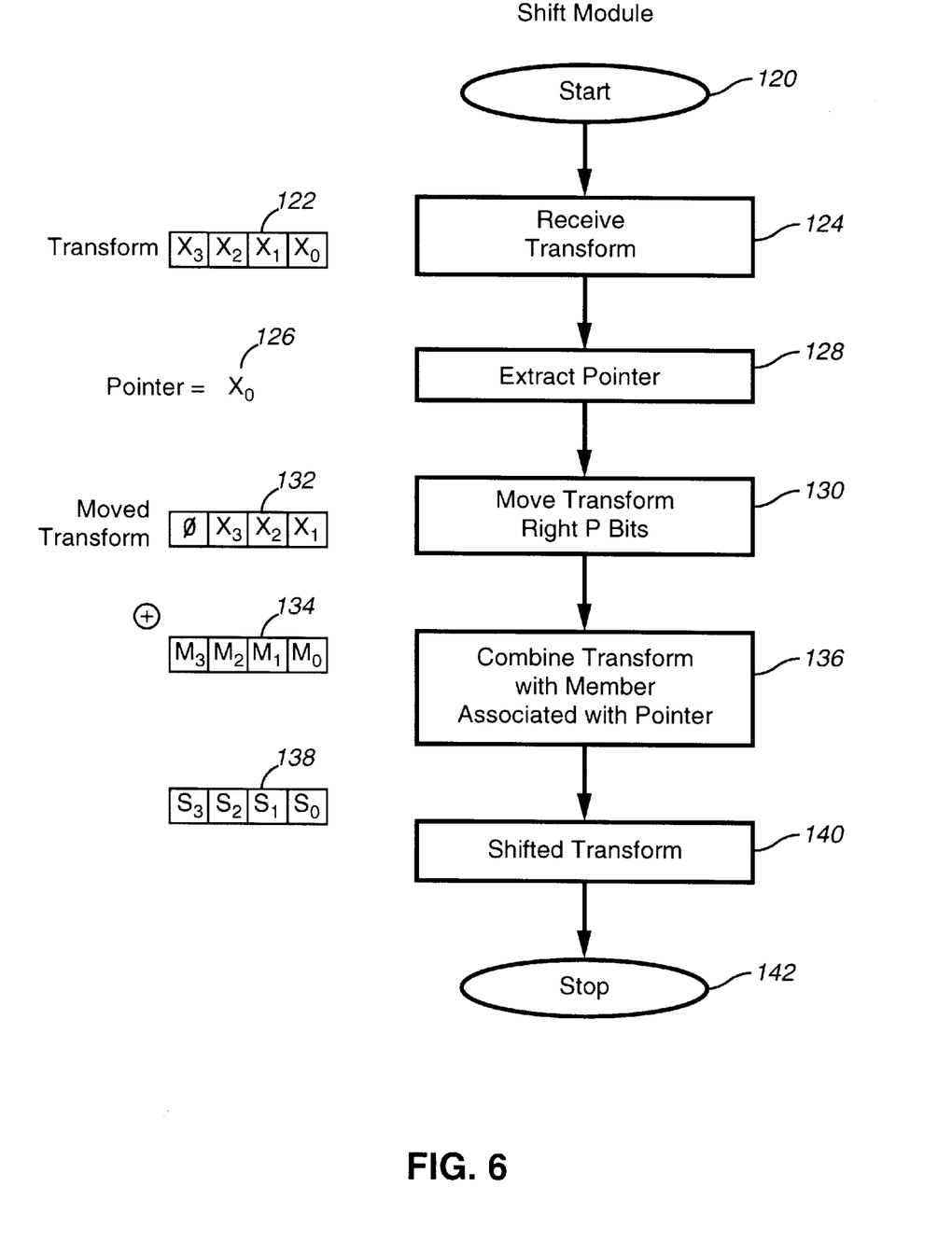
FIG. 6 is a flow chart of a shift module.

FIG. 6 is a flow diagram of the shift module. The shift module determines the transform for a shifted message (i.e., "A0"–$X^zA(X)$). The process starts, step 120, by receiving the transform 122 to be shifted at step 124. Next the a pointer 126 is extracted at step 128. The transform 122 is then moved right by the number of bits in the pointer 126, at step 130. This forms a moved pointer 132. Note the words right and left are used for convenience and are based on the convention that the most significant bits are placed on the left. When a different convention is used, it is necessary to change the words right and left to fit the convention. Next the moved transform 132 is combined (i.e., XOR'ed) with a member 134 associated with the pointer 126, at step 136. This forms the shifted transform 138 at step 140, which ends the process at step 142. Note that if the reason for shifting a first transform is to generate a first-second transform then first transform must be shifted by the number of bits in a second data string. This is done by executing the shift module X times, where X is equal to the number of data bits in the second data string divided by the number of bits in the pointer. Note that another way to implement the shift module is to use a polynomial generator like the one in FIG. 1. The first transform 122 is placed in the intermediate remainder register 14. Next a number of logical zeros (nulls) equal to the number of data bits in second data string are processed.

Figure 7:
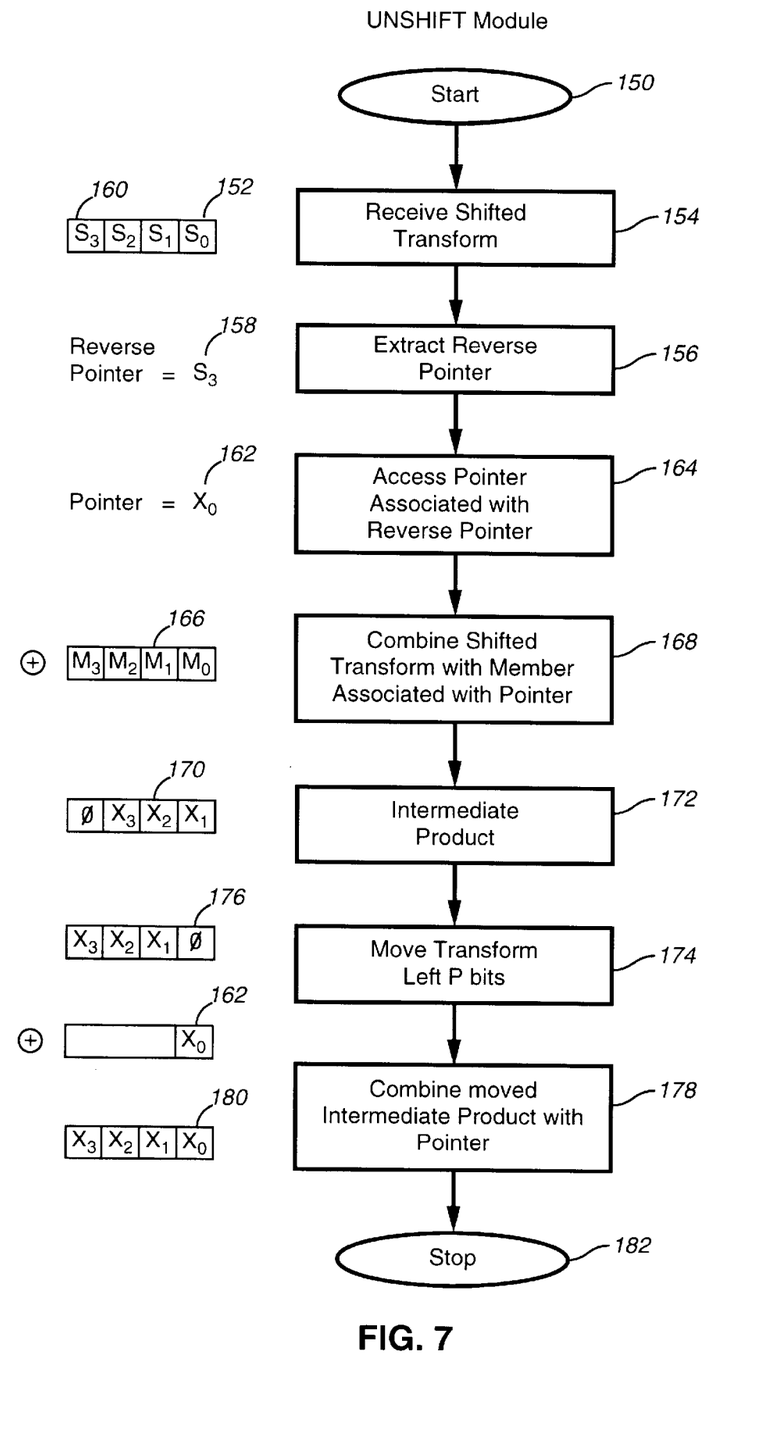
FIG. 7 is a flow chart of an unshift module.

FIG. 7 is a flow diagram of the unshift module. An example of when this module is used is when the transform for the data string "AB" is combined with the transform for the data string "B". This leaves the transform for the data string "A0" or $X^zA(X)$. It is necessary to "unshift" the transform to find the transform for the data string "A". The process starts, step 150, by receiving the shifted transform 152, at step 154. At step 156 a reverse pointer 158 is extracted. The reverse pointer 158 is equal to the most significant portion 160 of the shifted transform 152. The reverse pointer 158 is associated with a pointer 162 in the reverse look up table (e.g., see FIG. 14) at step 164. Next, the member 166 associated with the pointer 162 is combined with the shifted transform at step 168. This produces an intermediate product 170, at step 172. At step 174 the intermediate product 170 is moved left to form a moved intermediate product 176. The moved intermediate product 176 is then combined with the pointer 162, at step 178, to form the transform 180, which ends the process, step 182. Note that if the number of bit in the "B" data string (z) is not equal to the number of bits in the pointer then the unshift module is executed X times, where X=z/(number of bits in pointer).

Figure 8:
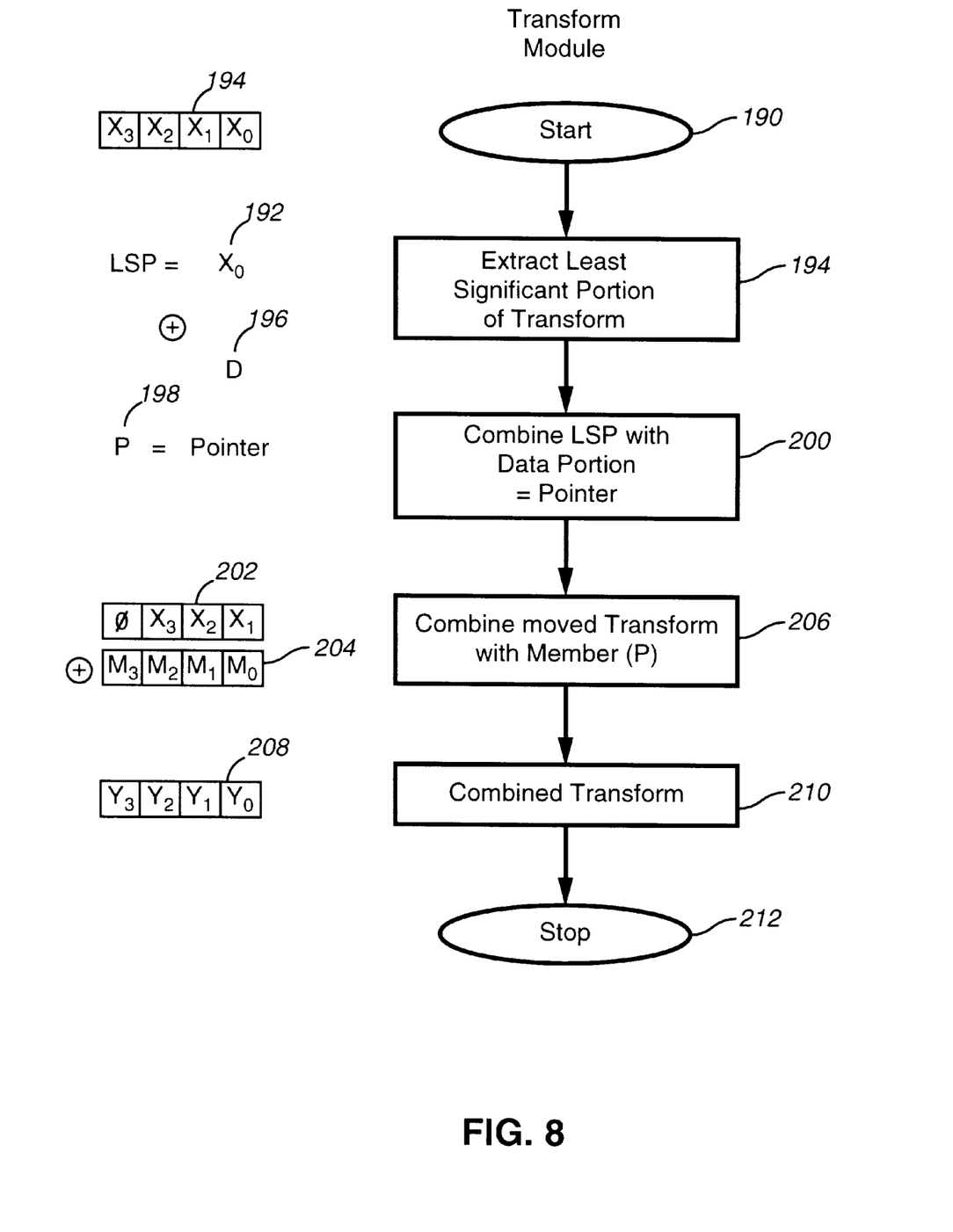
FIG. 8 is a flow chart of a transform module.

FIG. 8 is a flow chart of a transform module. The transform module can determine the first-second transform for a first-second data string given the first transform and the second data string, without first converting the second data string to a second transform. The process starts, step 190, by extracting a least significant portion 192 of the first transform 194 at step 194. This is combined with the second data string 196 to form a pointer 198, at step 200. Next a moved first transform 202 is combined with a member 204 associated with the pointer in the look up table (e.g., FIG. 12), at step 206. Creating a combined transform 208 at step 210, which ends the process, step 212. Note that if the pointer is one byte long then the transform module can only process one byte of data at a time. When the second data string is longer than one byte then the transform module is executed one data byte at a time until all the second data string has been executed. In another example assume that first transform is equal to all zeros (nulls), then the combined transform is just the transform for the second data string. In another embodiment the first transform could be a precondition and the resulting transform would be a precondition-second transform. In another example, assume a forth transform for a forth data string is desired. A first data portion (e.g., byte) of the forth data string is extracted. This points to a member in the look up table. When the forth data string contains more than the first data portion, the next data portion is extracted. The next data portion is combined with the least significant portion of the member to from a pointer. The member is then moved right by the number of bits in the next data portion to form a moved member. The moved member is combined with a second member associated with the pointer. This process is repeated until all the forth data string is processed.

Figure 9:
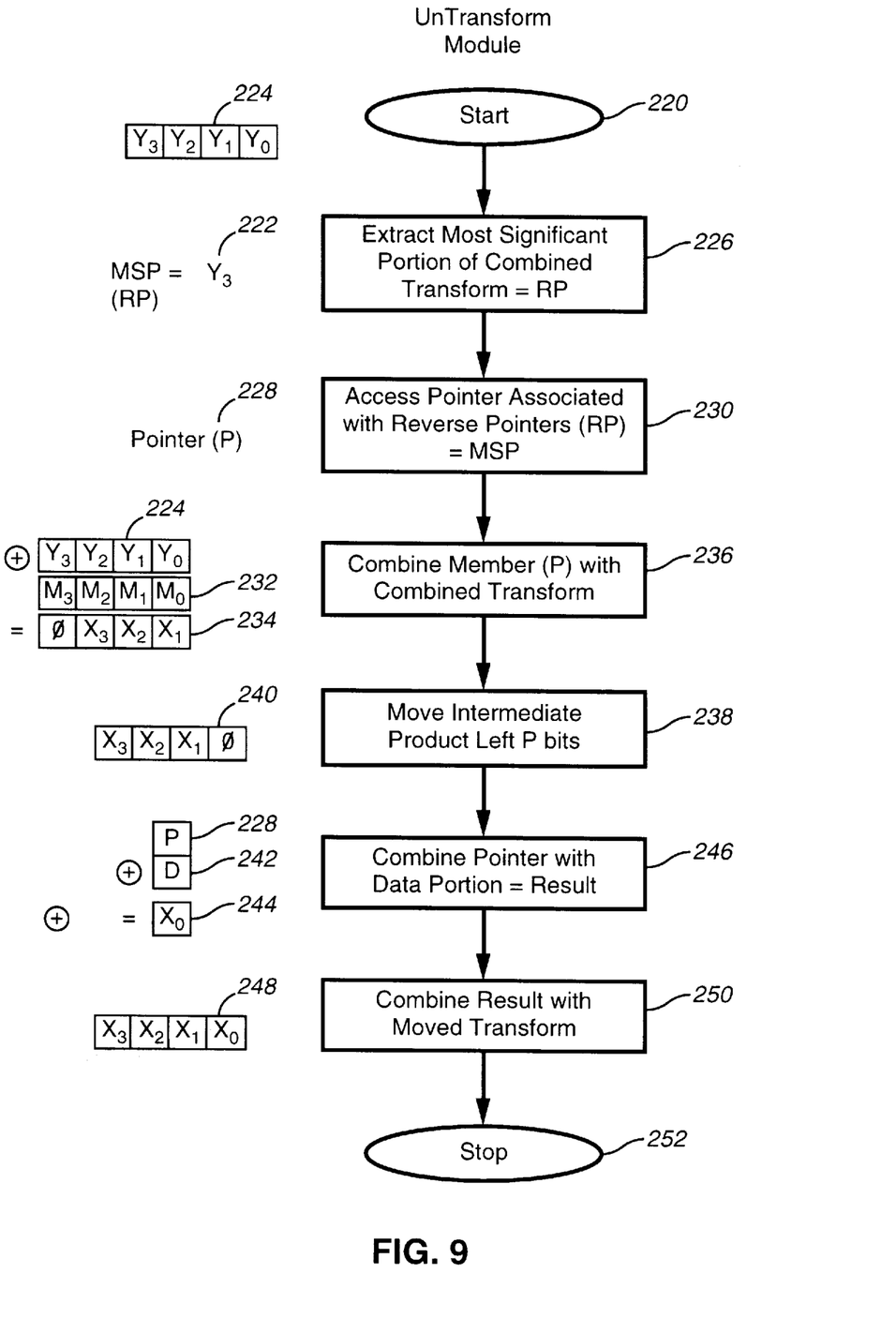
FIG. 9 is a flow chart of an untransform module.

FIG. 9 is a flow chart of an untransform module. The untransform module can determine the first transform for a first data string given the first-second transform and the second data string. The process starts, step 220, by extracting the most significant portion 222 of the first-second transform 224 at step 226. The most significant portion 222 is a reverse pointer that is associated with a pointer 228 in the reverse look-up table. The pointer is accessed at step 230. Next the first-second transform 224 is combined with a member 232 associated with the pointer to form an intermediate product 234 at step 236. The intermediate product is moved left by the number of bits in the pointer 228 at step 238. This forms a moved intermediate product 240. Next the pointer 228 is combined with the second data string 242 to form a result 244 at step 246. The result 244 is combined with the moved intermediate product 240 to form the first transform 248 at step 250, which ends the process at step 252. Again this module is repeated multiple times if the second data string is longer than the pointer.

Some examples of what the transform module 100 can do, include determining a second-third transform from a first-second-third transform and a first transform. The first transform is shifted by the number of data bits in the second-third data string. The shifted first transform is combined with the first-second-third transform to form the second-third transform. In another example, the transform generator 100 could determine a first-second-third-forth transform after receiving a forth data string. In one example, the transform module would first calculate the forth transform (using the transform module). The using the shift module the first-second-third transform would be shifted by the number of data bits in the forth data string. Then the shifted first-second-third transform is combined, using the combiner, with the forth transform.

Figure 10:
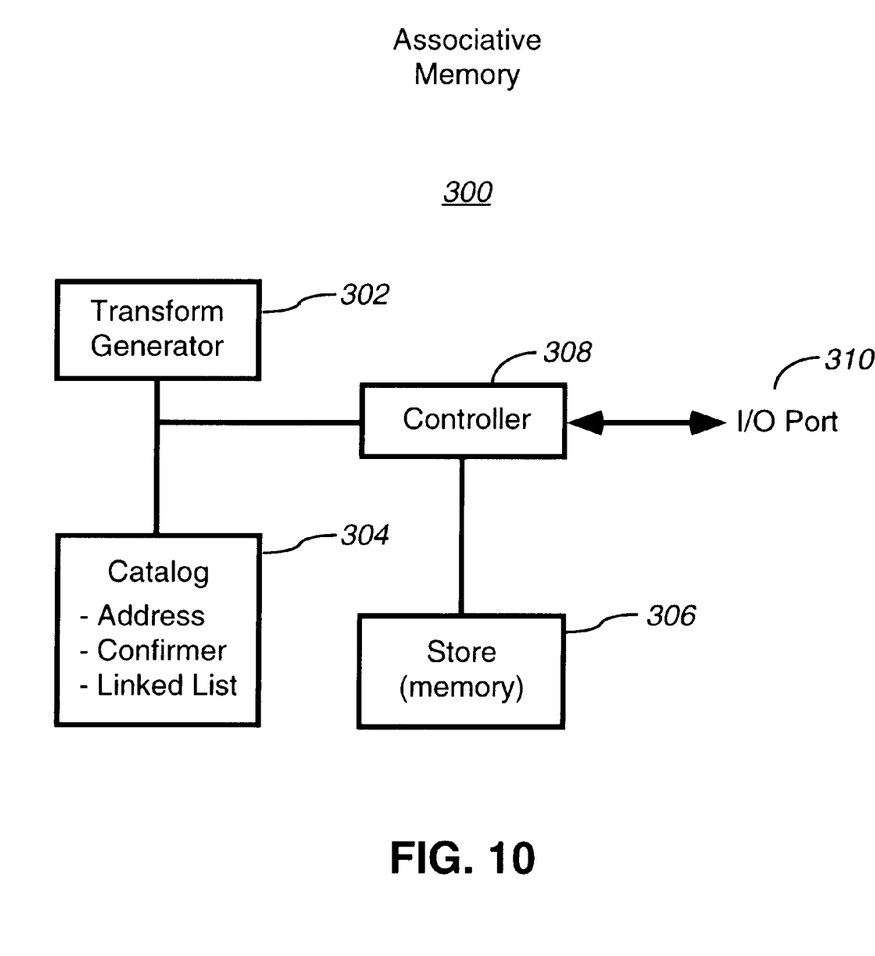
FIG. 10 is a block diagram of an associative memory.

FIG. 10 is a block diagram of an associative memory 300. The associative memory 300 uses a transform generator 302 to associate a data string with an address and a confirmer. Generally, the address is one half the transform and the confirmer is equal to the other half of the transform. A catalog 304 stores the list of addresses and their associated confirmers and a linked list if necessary. The linked list is necessary to resolve any conflicts. A conflict occurs if two different data strings transform to the same address. The linked list points to another address where a conflicting data string is stored. The confirmer is used to verify that the right address associated with the data string has been accessed. The catalog shows the address where the data string is stored in a memory (store) 306. The process is controlled by a controller 308 that communicates with the external world through an input/output port 310. If all the data strings are of fixed length it is possible to eliminate the use of a catalog 304. By using the transform generator 302 it is easy to look up if a first-second data string is stored by knowing the first transform and the second transform. It is also possible to quickly search for reverse ordering (i.e., second-first data strings). A wide variety of other fast searching routines will be obvious to those skilled in the art. Note that the requirements for the underling polynomial for an associative memory are not the same as those for a CRC. As a result a number of other polynomial generators can be used in this application.

Figure 11:
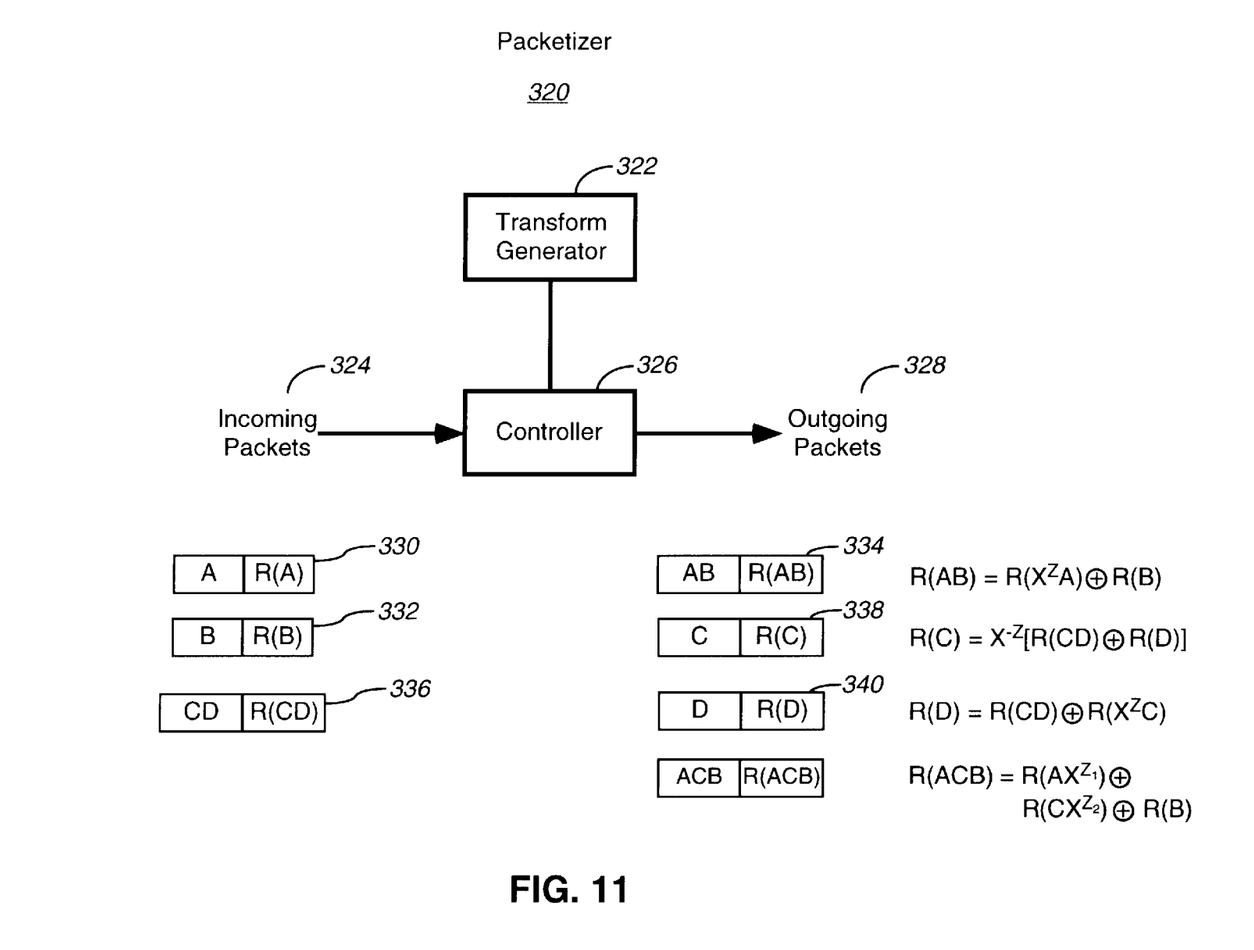
FIG. 11 is a block diagram of a packetizer.

FIG. 11 is a block diagram of a packetizer 320. The packetizer 320 is another example of a device that uses a transform generator 322 as described herein. In one example a packetizer is part of a router. A controller 326 receives incoming packets 324. The controller 326 forms up outgoing packets 328 from the incoming packets 324. Commonly, the outgoing packets 328 are of a fixed length and the incoming packets 324 are of either indefinite length or a different length. Often the incoming data has not been formed into packets before at all. An out going packet 334 may be formed from two small packets 330, 332 going to the same destination. The data packets contain a data portion ("A" or "B") and a CRC or transform [R(A) or R(B)]. Using the transform generator 322 the CRC [R(AB)] for the combined packet ("AB") 334 can be quickly determined given the CRC's of the individual packets 330, 332. In another example, the incoming packet 336 is too large and must be broken into two packets 338, 340. The two new CRCs can be easily calculated by first calculating the transform (e.g., [r(C)]) for the shorter of the two data strings and removing this transform from the combined transform to form the other CRC [R(D)]. Other examples can be imagined where more exotic manipulations of the CRCs are required. The transform generator as described herein can perform all these calculations without recalculating the CRCs from scratch using the underlying data.

Figure 12:
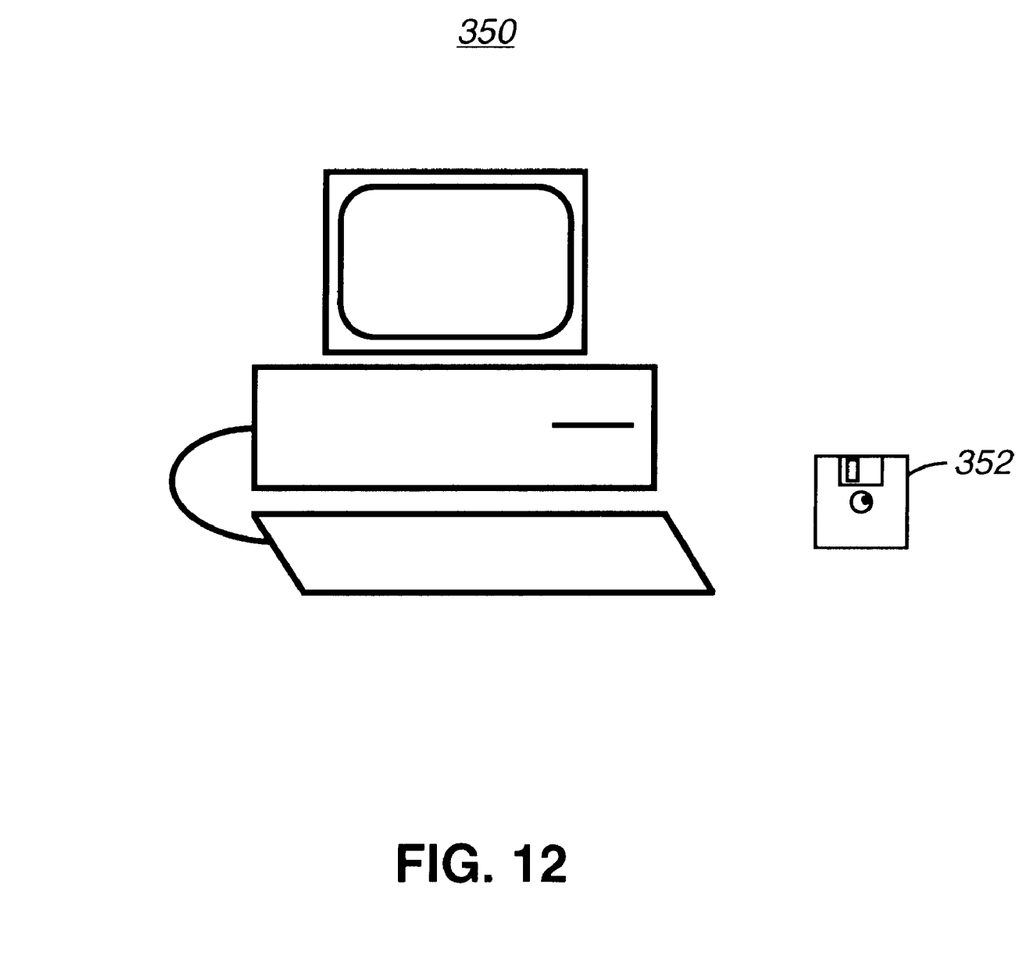
FIG. 12 is a schematic diagram of a general purpose computer and a computer-readable storage medium containing computer-readable instructions.

FIG. 12 is a schematic diagram of a general purpose computer 350 and a computer-readable storage medium 352 containing computer-readable instructions. The computer-readable storage medium 352 contains instruction that when executed by the computer 350 it performs the function of the transform generator 100. These instructions may be stand alone or as part of a set of instructions that perform the functions of the associative memory 300 or that perform the functions of the packetizer 320.

Thus there has been described a transform generator that can determine a combined transform from a plurality of separate transforms without access to the underlying data. In addition, the transform generator can perform a wide variety of other manipulations of transforms that arise in packetizers and associative memories. The utility of the transform generator is not limited to the two examples (i.e., associative memories and packetizers) described herein. Many other applications will be obvious to those skilled in the art.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of generating a transform for a data string wherein the transform defines an address in an associative memory, the method comprising the steps of:
   (a) receiving a first transform associated with a first data string that defines an address in the associative memory for the first data string;
   (b) receiving a second transform associated with a second data string that defines an address in the associative memory for the second data string;
   (c) determining a first-second combined transform from the second transform and the first transform wherein the first-second combined transform is a transform for a first-second data string and defines an address in the associative memory for the first-second data string; and
   (d) looking up the address in the associative memory for the first-second data string to determine if the first-second data string is stored in the associative memory.

2. The method of claim 1, further including the steps of:
   (d) removing the second transform from the first-second combined transform to form a shifted first transform;
   (e) unshifting the shifted first transform to form the first transform.

3. The method of claim 2, wherein the step of unshifting includes the steps of:
   (i) extracting a reverse pointer from the shifted first transform;
   (ii) reading a pointer in a reverse look up table;
   (iii) combining a member of a look up table associated with the pointer with the shifted first transform, to form an intermediate product;
   (iv) moving the intermediate product left by a number of bits in the pointer, to form a moved intermediate product; and
   (v) combining the moved intermediate product with the pointer.

4. The method of claim 3 wherein steps (i) through (v) are repeated X times, where X equals the number of bits in the second data string divided by a number of bits in the pointer.

5. The method of claim 1, wherein the step of appending includes the steps of:
   (i) shifting the first transform right by the number of bits in the second data string to form a shifted first transform; and
   (ii) combining the shifted first transform with the second transform.

6. The method of claim 1, wherein the transform is the result of a polynomial code applied to a data string.

7. The method of claim 6, wherein the polynomial code is a cyclical redundancy code.

8. The method of claim 1, further including the steps of:
   (d) receiving a first-second-first transform associated with a first-second-third data string;
   (e) shifting the first transform by a number of bits in a second-third data string to form a shifted first transform; and
   (f) combining the first-second-third transform with the shifted first transform, to form a second-third transform.

9. The method of claim 8, further including the steps of:
   (g) receiving a fourth data string;
   (h) calculating a fourth transform;
   (i) shifting the first-second-third transform by a number of bits in the fourth data string to form a shifted first-second-third transform; and
   (j) combining the shifted first-second-third transform with the fourth transform to form a first-second-third-fourth transform.

10. The method of claim 9, wherein the step of calculating the fourth transform includes the steps of:
    (i) extracting a first data portion of a fourth data string;
    (ii) accessing a member associated with the first data portion in a look up memory table;
    (iii) when the fourth data string contains more than the first data portion, extracting a next data portion;
    (iv) combining the next data portion with a least significant portion of the member, to form a pointer;
    (v) moving the member right by a number of bits in the next data portion, to form a moved member;
    (vi) combining the moved member with a second member associated with the pointer; and
    (vii) repeating steps (iv) through (vi) until all of the fourth data string has been processed.

11. The method of claim 8, wherein the step of shifting includes the steps of:
    (i) extracting a pointer from the first transform;
    (ii) moving the first transform right by a number of bits in the pointer to form a moved first transform;
    (iii) combining the moved first transform with a member of a look up table associated with the pointer.

12. The method of claim 11, wherein steps (i) through (iii) are repeated X times, where X is equal to the number of bits in the pointer divided by the number of bits in the second-third data string.

13. The method of claim 8, wherein the step of shifting includes the steps of:
    (i) placing the first transform in an intermediate register of a polynomial generator;
    (ii) processing a number of logical zeros equal to the number of bits in the second-third data string.

14. A computer-readable storage medium containing computer-readable instructions that when inserted into a computer performs the following steps:
    (a) receiving a first transform associated with a first data string;
    (b) receiving a second transform associated with a second data string;
    (c) extracting a pointer from the first transform;
    (d) finding a member associated with the pointer;
    (e) moving the first transform toward a least significant bit by a number of bits in the pointer to form a moved transform;
    (f) combining the moved transform and the member to form a shifted transform; and
    (g) combining the shifted transform with the second transform to form a first-second combined transform for a first-second data string.

15. The computer-readable storage medium of claim 14, further including the steps of:
    (d) removing the second transform from the first-second combined transform to form a shifted first transform;
    (e) unshifting the shifted first transform to form the first transform.

16. The computer-readable storage medium of claim 14, wherein the step of appending includes the steps of:
    (i) shifting the first transform right by a number of bits in the second data string to form a shifted first transform; and (ii) combining the shifted first transform with the second transform.

17. A transform generator comprising:

a input/output port;

a controller coupled to the input/output port;

a look up memory coupled to the controller;

a shift module having a transform register coupled to the input/output port, a look up register having an input coupled to the look up memory, an output register is coupled by an exclusive OR gate to an output of the transform register and the look up register; and a combiner coupled to the controller.

18. The transform generator of claim 17, further including an unshift module coupled to the controller.

19. The transform generator of claim 17, further including a transform module coupled to the controller.

20. The transform generator of claim 17, further including an untransform module coupled to the controller.

21. A method of generating a transform for a data string wherein the transform defines an address in an associative memory, the method comprising the steps of:

(a) receiving a first-second combined transform associated with a first-second data string that defines an address in the associative memory for the first-second data string;

(b) receiving a second transform associated with a second data string that defines an address in the associative memory for the second data string;

(c) removing the second transform from the first-second transform to form a shifted first transform;

(d) unshifting the first transform to form the first transform that defines an address in the associative memory for the first data string; and (e) accessing the address in the associative memory for the first data string to determine if the first data string is stored in the associative memory.

22. The method of claim 21, wherein the step of unshifting includes the steps of:

(i) extracting a reverse pointer from the shifted first cyclical redundancy code;

(ii) reading a pointer in a reverse look up table;

(iii) combining a member of a look up table associated with the pointer with the shifted first cyclical redundancy code, to form an intermediate product;

(iv) moving the intermediate product left by a number of bits in the pointer, to form a moved intermediate product; and (v) combining the moved intermediate product with the pointer.

* * * * *

UNITED STATES PATENT AND TRADEMARK OFFICE
CERTIFICATE OF CORRECTION

PATENT NO. : 5,942,002
DATED : August 24, 1999
INVENTOR(S) : Christopher Brandin It is certified that error appears in the above-identified patent and that said Letters Patent is hereby corrected as shown below:

On the title page, insert item [73] Assignee:

-- Neo-Core--.

Signed and Sealed this

Twenty-eighth Day of December, 1999

Attest:

Q. TODD DICKINSON

*Attesting Officer*  *Acting Commissioner of Patents and Trademarks*